United States Patent
Chen et al.

(10) Patent No.: US 7,578,214 B2
(45) Date of Patent: Aug. 25, 2009

(54) PRELOAD STRUCTURE FOR A BALL SCREW

(75) Inventors: Yan-Yu Chen, Taichung (TW); Yu-Pei Chang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 194 days.

(21) Appl. No.: 11/757,346

(22) Filed: Jun. 1, 2007

(65) Prior Publication Data

US 2008/0295630 A1   Dec. 4, 2008

(51) Int. Cl.
*F16H 1/18* (2006.01)
(52) U.S. Cl. .............. 74/424.81; 74/424.82; 74/424.86
(58) Field of Classification Search ............. 74/424.81, 74/424.82, 424.86
See application file for complete search history.

(56) References Cited

U.S. PATENT DOCUMENTS

| 4,542,661 | A | * | 9/1985 | Teramachi | 74/424.75 |
| 5,501,118 | A | * | 3/1996 | Benton | 74/441 |
| 6,237,434 | B1 | * | 5/2001 | Brown et al. | 74/424.82 |

* cited by examiner

*Primary Examiner*—David M Fenstermacher
(74) *Attorney, Agent, or Firm*—Banger Shia (57) ABSTRACT

A preload structure for a ball screw in the inner surface of a nut is formed a helical groove whose lead is different from the lead of the adjacent helical groove to produce a lead deviation between the helical groove of the nut and the helical groove of the screw. By such arrangements, the lead deviation can be used to achieve the preload objective, thus reducing the fitting number demanded of the circulation system. Consequently, not only the single circulation system fittings can be used, but also the length of the nut is shorter and without extra machining, and the producer only needs to control the deviation of the interval helical track during rubbing to achieve various preload changes.

8 Claims, 9 Drawing Sheets

PRELOAD STRUCTURE FOR A BALL SCREW

BACKGROUND OF THE INVENTION

1. Field of the Invention

The present invention relates to a ball screw structure, and more particularly to a preload structure for a ball screw located inside a nut, which can be utilized to achieve the preload objective to reduce the number of the circulation system fittings, shorten the length of the nut, reduce the extra machining and achieve various preload changes by controlling the deviation of the interval helical track during rubbing.

2. Description of the Prior Art

The linear drive technology and its products have been the most important portions of many precision machine tools for the constant research and the improvement on the precision feed system. Various linear products have come into our everyday life, manufacturing factories and high-tech equipments. Although the technology of the ball screw is developing quite fast, consumers still expect optimum to come. Therefore, improvement has to be made. Such a desire for constant improvement of technology is quite strong in many high precision mechanism-manufacturing fields (such as wafer process equipment, CNC equipment, etc) that require more stability and less noise). For this matter, the existing linear mechanism needs a better solution.

Figure 1:
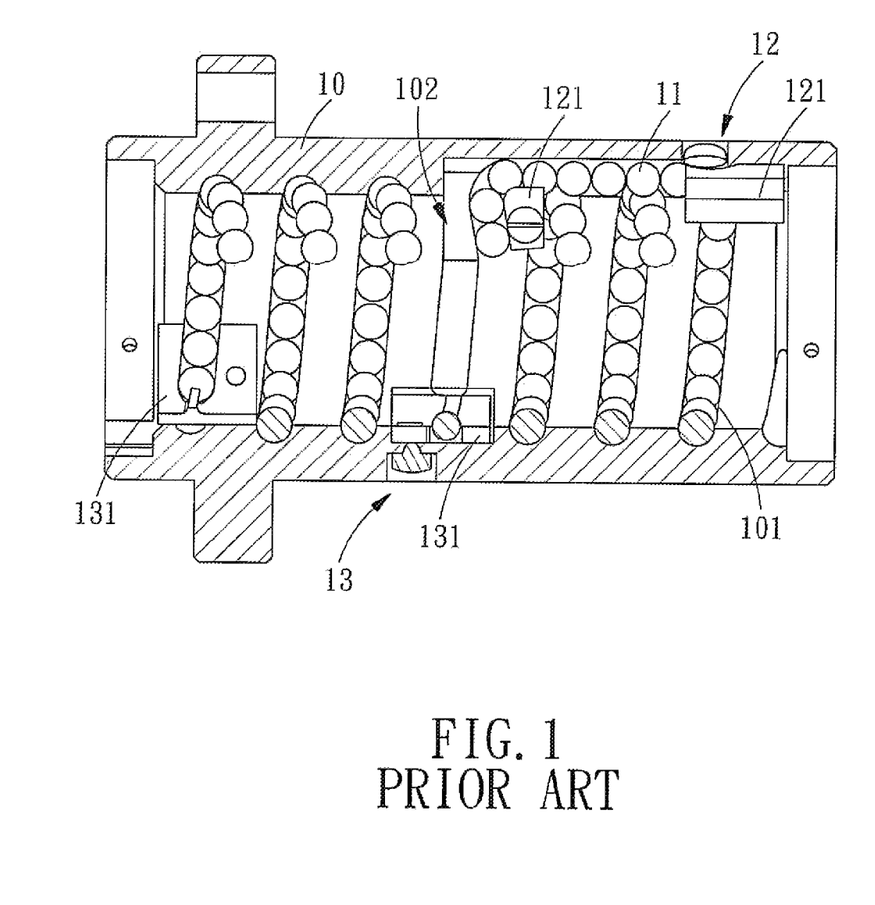
FIG. 1 is a cross sectional view of a conventional preload structure for a ball screw.
Figure 2:
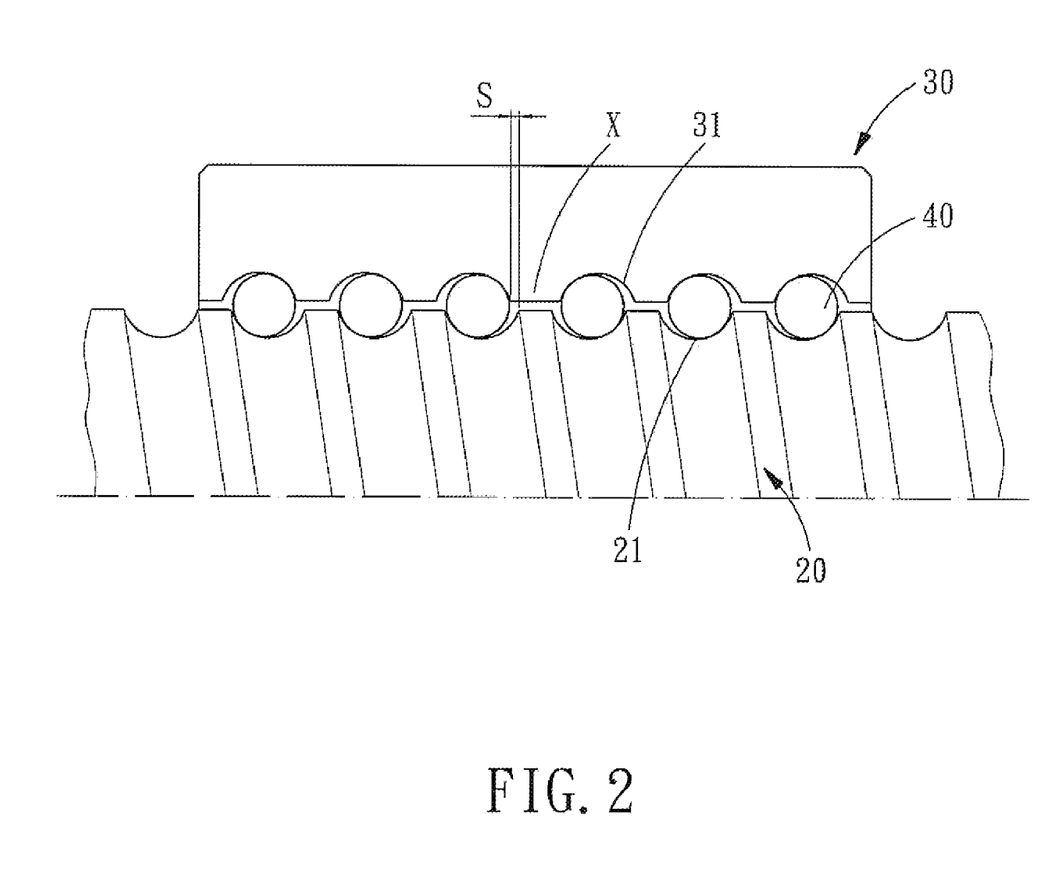
FIG. 2 is a simplified cross sectional view of a preload structure in accordance with the present invention.
Figure 3:
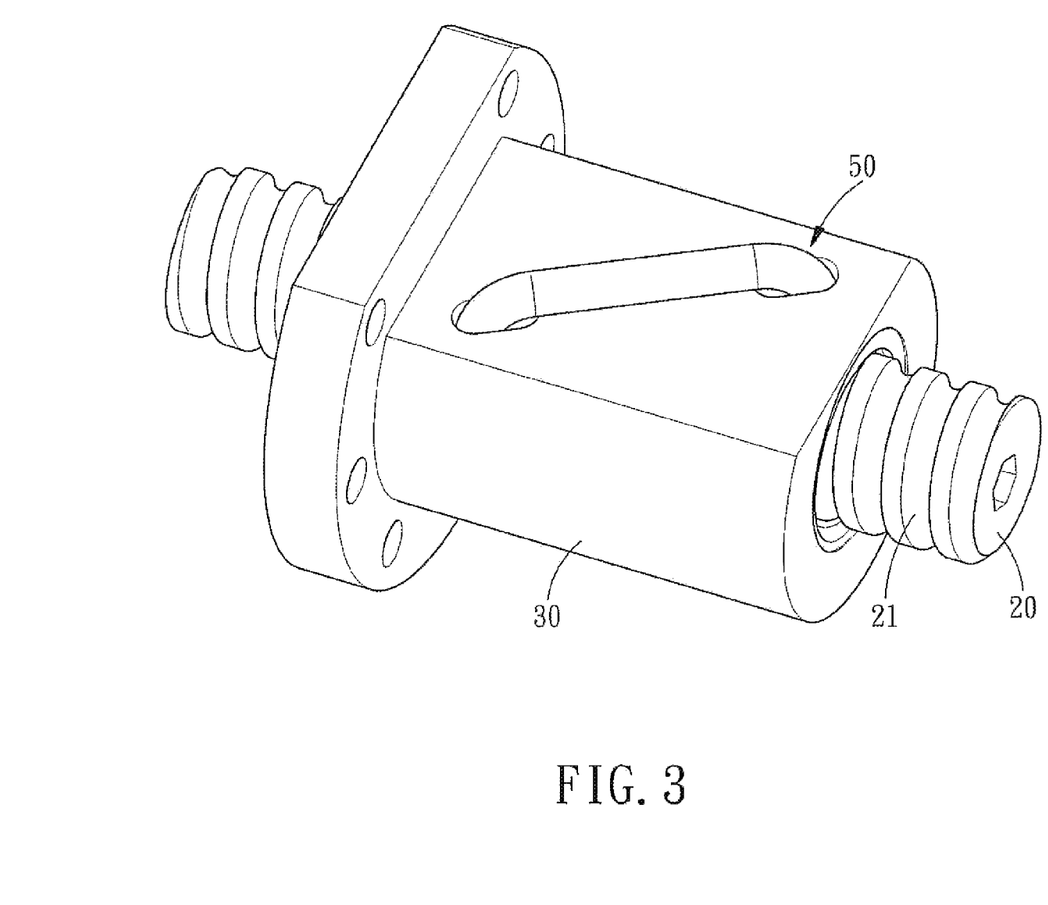
FIG. 3 is a perspective view of showing that the preload structure in accordance with the present invention cooperates with an outer circulation system.

Generally, the ball screw used on the market must be designed with a structure inside, which produces bias pressure to support every element therein stably. As shown in FIG. 1, a conventional ball screw structure disclosed by US Patent No. 2005/0000309 comprises a screw (not shown), a nut 10, a plurality of rolling elements 11 and two circulation systems 12, 13. The outer surface of the screw is formed with a helical groove. The inner surface of the nut 10 is formed with a helical groove 101. The two circulation systems 12, 13 are disposed on the front end and the back end of the nut 10 respectively, so as to make rolling elements 11 which have passed through the helical groove 101 circulate at the front end and the back end of the nut 10.

The abovementioned ball screw structure uses a single nut 10 to offer bias preload function. Generally, a void tooth 102 between the two unattached circulation systems 12, 13 produces a lead deviation to make the rolling elements 11 in the two independent circulation systems 12, 13 bear outwards-drawing symmetric forces. Since the preload is a necessary design and the conventional nut 10 must be installed with two circulation systems 12, 13, the machining of each circulation device 121, 131 and each section of circular path causes the conventional ball screw to produce the following technology bottlenecks:

First, the number of the fittings of the conventional ball screw is large and the number of the machining procedure is large, the inner design is complicated and difficult to machine, so the cost of the conventional ball screw is high.

Second, the conventional ball screw utilizes a void tooth 102 between the two independent circulation systems 12, 13 to do the lead deviation, but the existence of the void tooth causes the length of the nut to be increased, thus causing limitations in design and waste.

Third, the two independent circulation systems 12, 13 must be installed with four built-in circulating devices 121, 131 in total, thus increasing the machining difficulty.

It is known from the abovementioned products, the problems caused by the conventional preload design are the emphasis that the producers expect to improve. If the producers want to change the preload direction, the designs of the circulation systems, void tooth, the lead and the nut must be completely changed.

The present invention has arisen to mitigate and/or obviate the afore-described disadvantages.

SUMMARY OF THE INVENTION

The primary objective of the present invention is to provide a preload structure for a ball screw, which can reduce fitting number demanded of a circulation system, reduce the design complexity and reduce the cost.

The helical groove in the inner surface of nut of the present invention includes an interval helical track whose lead is different from the lead of adjacent helical groove, so as to produce a lead deviation between the lead of the helical groove of the nut and the lead of the helical groove of the screw. By such arrangements, the producers can reduce the fitting number demanded of the circulation system. Moreover, since the inner machining has been greatly simplified, the preload structure for a ball of the present invention can really reduce the design complexity and the cost of the component number, machining and assembly.

The second objective of the present invention is to provide a pressing structure for a ball screw, which can shorten the length of the nut.

The interval helical track can be located at the front section, central section or the rear section of the nut to produce the lead deviation between the lead of the helical groove of the nut and the lead of the helical groove of the screw, and avoid the exist of the void tooth. Consequently, under the same rolling element number demanded, the preload structure for a ball screw of the present invention can shorten the length of the nut.

The abovementioned lead deviation of the interval helical track can cause the difference between the lead angle of the interval helical track and the lead angle of the screw.

The third objective of the present invention is to provide a preload structure for a ball screw, which can be used to design various preload changes.

The present invention utilizes the interval helical track to produce the lead deviation which can be readily adjusted, according to the machining size of the interval helical track, such as: if the lead deviation in the middle of the nut is equal, it will cause the preload forces of each section to be equal, or the lead deviation can be gradually changed from small to larger or from large to smaller, or the lead deviation between the helical groove of the nut and the helical groove of the screw can be positive or negative, so as to cause the preload force directions of the rolling elements at both sides of the interval helical track to be opposite or reverse in direction.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 4:
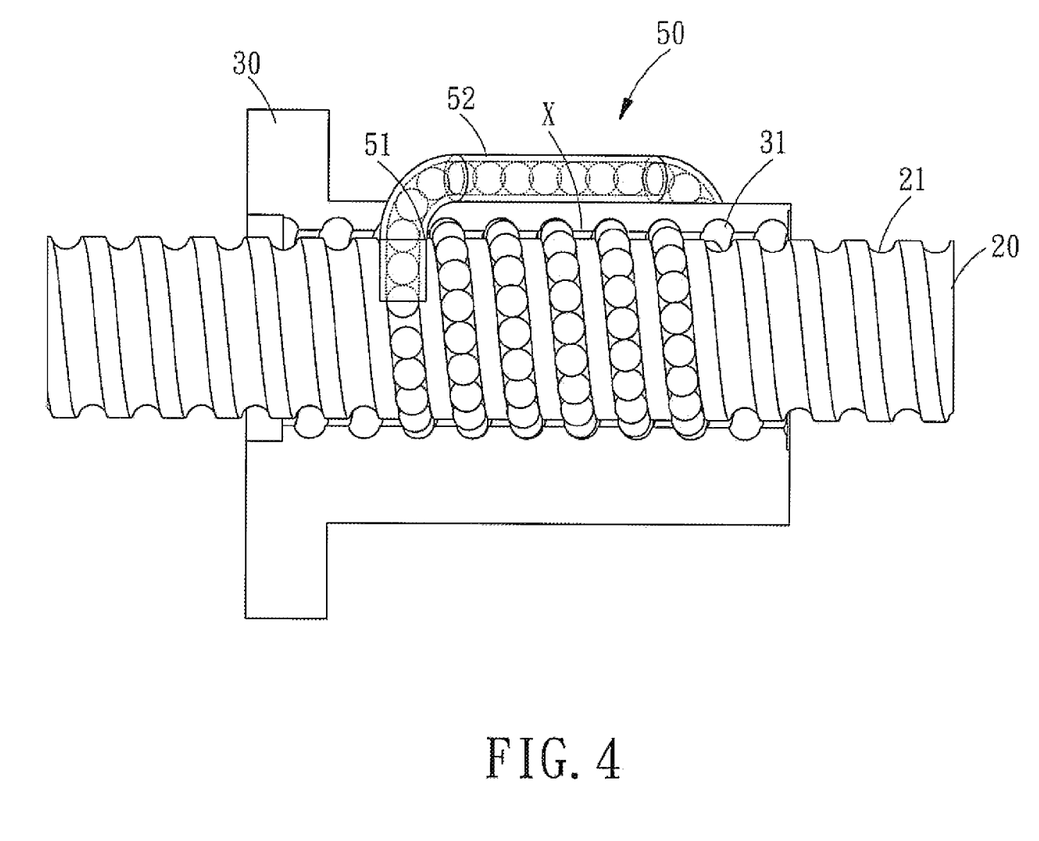
FIG. 4 is a cross sectional view of showing that the preload structure in accordance with the present invention cooperates with the outer circulation system.
Figure 5:
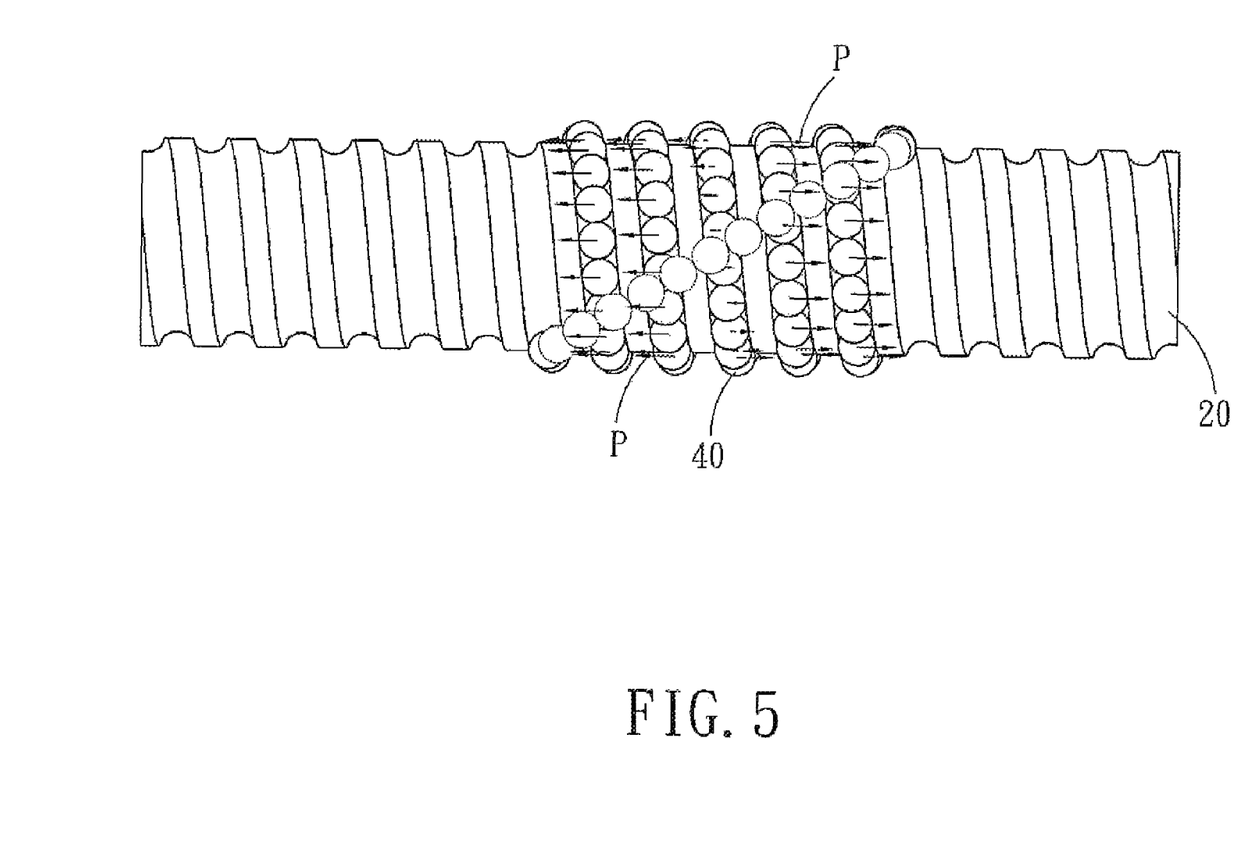
FIG. 5 shows that the preload structure in accordance with the present invention that cooperates with the outer circulation system is taken away the nut.

Referring to FIGS. 2-5, a preload structure for a ball screw in accordance with a preferred embodiment of the present invention comprises a screw 20, a nut 30, a plurality of rolling elements 40 and a circulation system 50. The circulation system 50 is a conventional outer circulation structure as shown in FIG. 4, and the preload structure of the present invention is characterized in that:

The screw 20 is formed with a helical groove 21 in the outer surface thereof.

The nut 30 is formed with a helical groove 31 in the inner surface thereof, and between the front section and the rear section of the helical groove 31 is provided an interval helical track X. The lead of the interval helical track X is different from that of the adjacent helical groove 31, and as a result, the lead of the interval helical track X is greater than that of the helical groove 31 at both sides of the helical track X, so as to produce an outward-directed lead deviation S between the helical groove 31 of the nut 30 and the helical groove 21 of the screw 20.

The rolling elements 40 are retained between the helical groove 21 of the screw 20 and the helical groove 31 of the nut 30. The interval helical track X produces the lead deviation S between the helical groove 31 of the nut 30 and the helical groove 21 of the screw 20, and the outwards-directed lead deviation S will produce outward preload forces P on the rolling elements.

The circulation system 50 is mounted on the nut 30 and comprises two passageways 51 and an outer circulation pipe 52. The two passageways 51 link up with the head and the tail of the operational section of the helical groove 21 of screw 20 and the helical groove 31 of the nut 30 respectively. The circulation system 50 is provided for circulation of the rolling elements 40 which have passed through the helical grooves 31, 21.

The aforementioned is the summary of the positional and structural relationship of the respective components of the preferred embodiment in accordance with the present invention.

For a better understanding of the present invention, its operation and function, reference should be made to the following description.

The lead of the interval helical track X of the nut 30 of the present invention is different from that of the adjacent helical groove 31. The lead of the interval helical track X is greater than that of the helical groove 31 at both sides of the helical track X, so as to produce an outward-directed lead deviation S between the helical groove 31 of the nut 30 and the helical groove 21 of the screw 20. The rolling elements 40 are retained between the helical groove 21 of the screw 20 and the helical grove 31 of the nut 30, and the outwards-directed lead deviation S will produce outward preload forces P on the rolling elements.

At this time, since the rolling elements 40 at both sides of the interval helical track X bear the outward preload forces P, they can be positioned against the helical groove 21 of the screw 20 and the helical groove 31 of the nut 30 stably, thus achieving the original objective of producing preload force.

On the other hand, the lead of the interval helical track X is greater than that of the helical groove 31 at both sides of the interval helical track X, so as to produce the outward-directed lead deviation S between the helical groove 31 of the nut 30 and the helical groove 21 of the screw 20. The rolling elements 40 at both sides of the interval helical track X bear opposite preload forces. The lead deviation S between the helical groove 31 and the helical groove 21 at both sides of the interval helical track X is the same, so the rolling elements 40 between the helical groove 31 and the helical groove 21 at each side of the interval helical track X are loaded equally.

Figure 6:
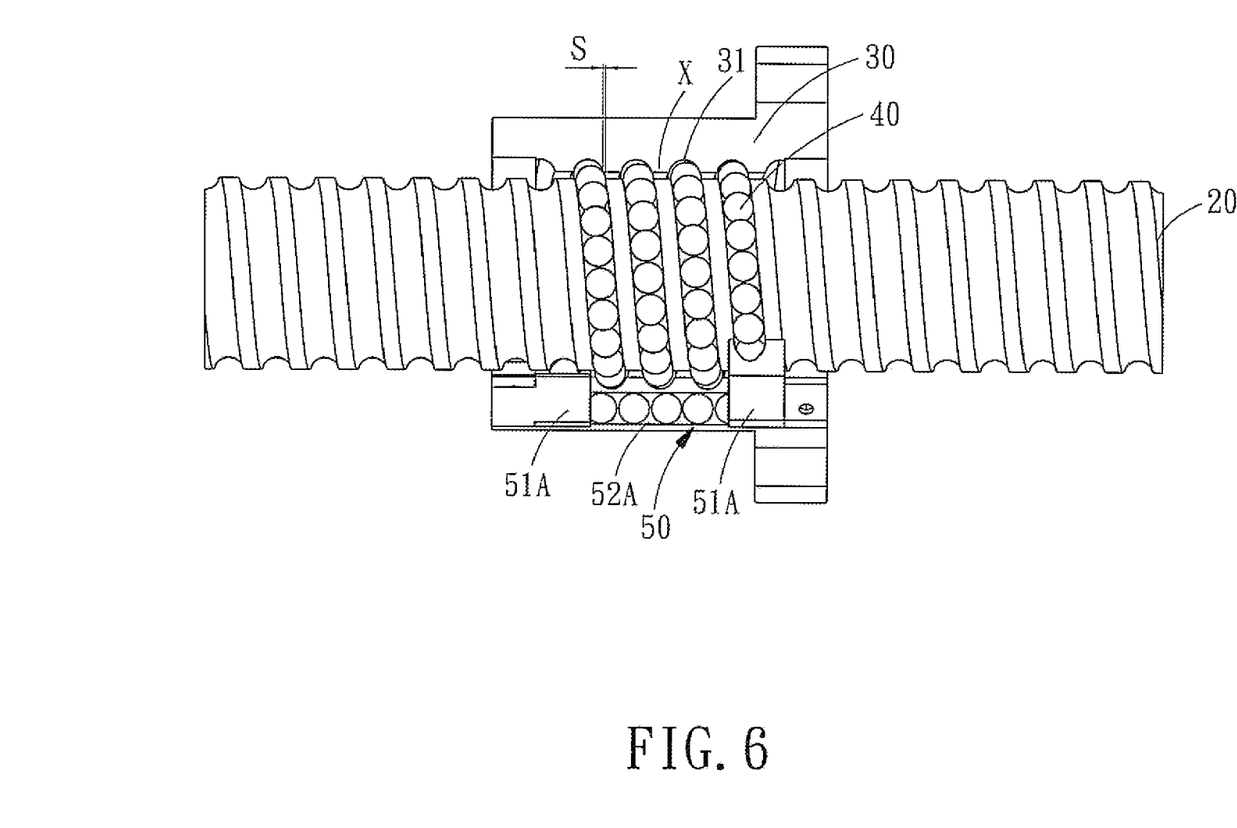
FIG. 6 is a cross sectional view of showing that the preload structure in accordance with the present invention cooperates with an inner circulation system.
Figure 7:
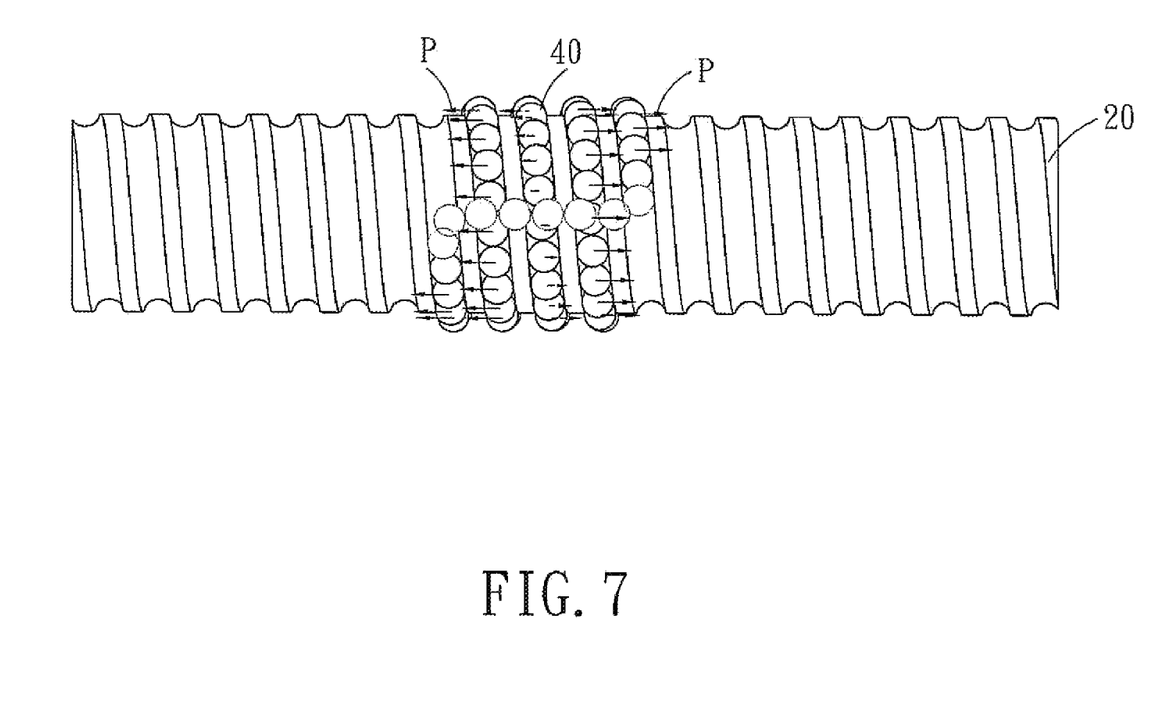
FIG. 7 shows that the preload structure in accordance with the present invention that cooperates with the inner circulation system is taken away the nut.

Referring to FIG. 6 and FIG. 7, a preload structure for a ball screw in accordance with another preferred embodiment of present invention adopts an inner circulation system 50. The inner circulation system 50 is also mounted on the nut 30 and comprises two circulation devices 51A and an inner circulation path 52A formed inside the nut 30. The two circulation devices 51A link up with the head and the tail of the operational section of the helical groove 21 of screw 20 and the helical groove 31 of the nut 30 respectively. The circulation system 50 is provided for the circulation of the rolling elements 40 which have passed through the abovementioned helical grooves 31, 21.

The lead of the interval helical track X of the nut 30 is different from the lead of the adjacent helical groove 31, so as to produce a lead deviation S between the helical groove 31 of the nut 30 and the helical groove 21 of the screw 20. Moreover; the lead of the interval helical track X is greater than that of helical groove 31 at both sides of the helical track X, so as to produce an outwards-directed lead deviation S between the helical groove 31 of the nut 30 and the helical groove 21 of the screw 20. Additionally, the rolling elements 40 are retained between the helical groove 21 of the screw 20 and the helical groove 31 of the nut 30, and the outwards-directed lead deviation S will produce the outward preload forces P on the rolling elements 40. Hence, the rolling elements 40 can be positioned against the helical groove 21 of the screw 20 and the helical groove 31 of the nut 30 stably to achieve the original objective of producing preload force.

The forces applied on the rolling elements 40 at both sides of the interval helical track X of the inner circulation mode in accordance with the present invention are opposite in direction, and the rolling elements 40 between the helical grooves 31, 21 at each side of the interval helical track X are loaded equally.

Figure 8:
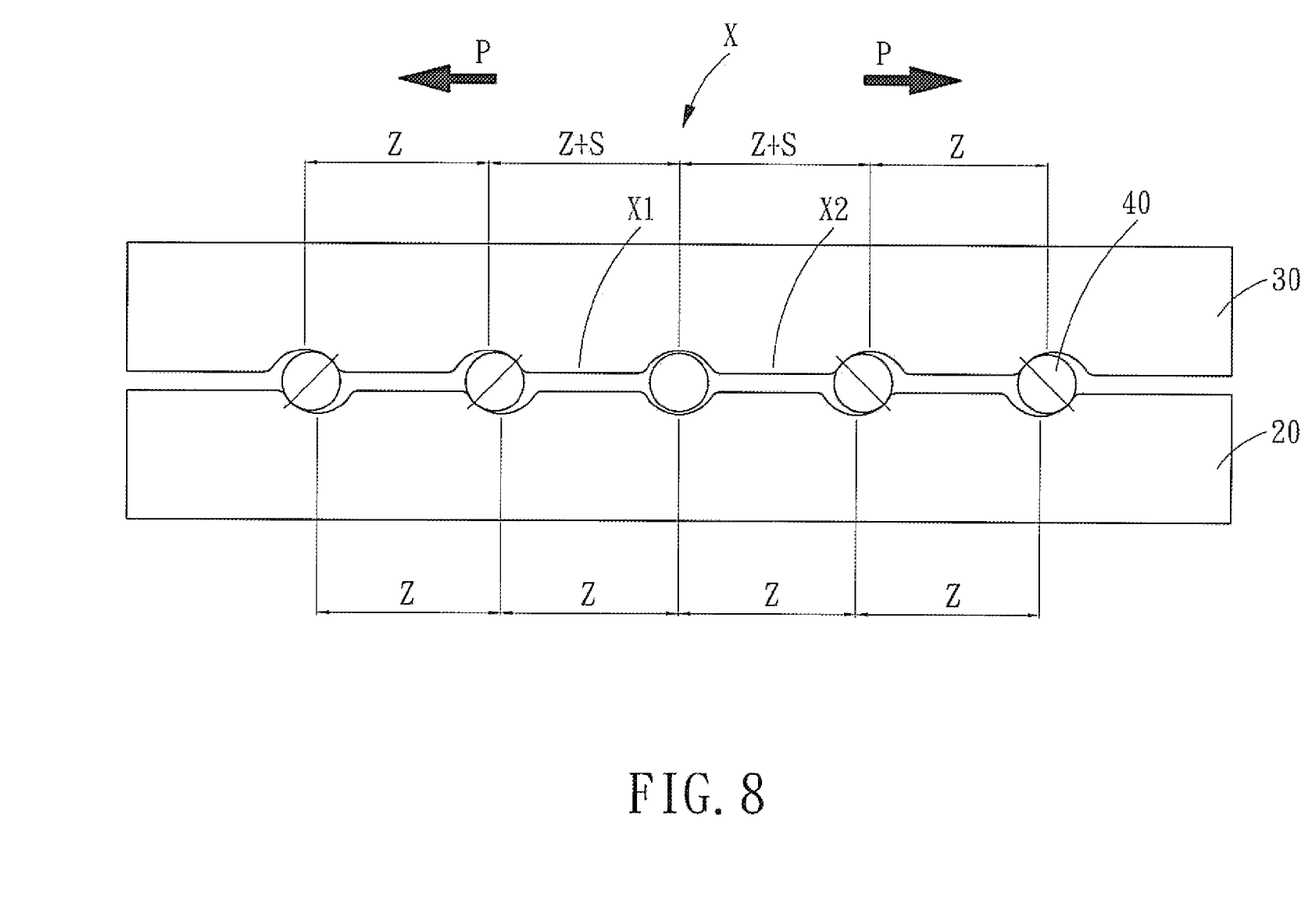
FIG. 8 is an illustrative view of showing that the lead deviation is gradually changed from large to smaller.

It is to be noted that, further referring to FIG. 8, the interval helical track X of the present invention, includes a first track X1, a second track X2, and a lead deviation S is added to the lead lengths Z of the first track X1 and the second track X2 respectively. By such arrangements, the preload forces P caused by lead deviation S to the rolling elements 40 are opposite in direction.

Figure 9:
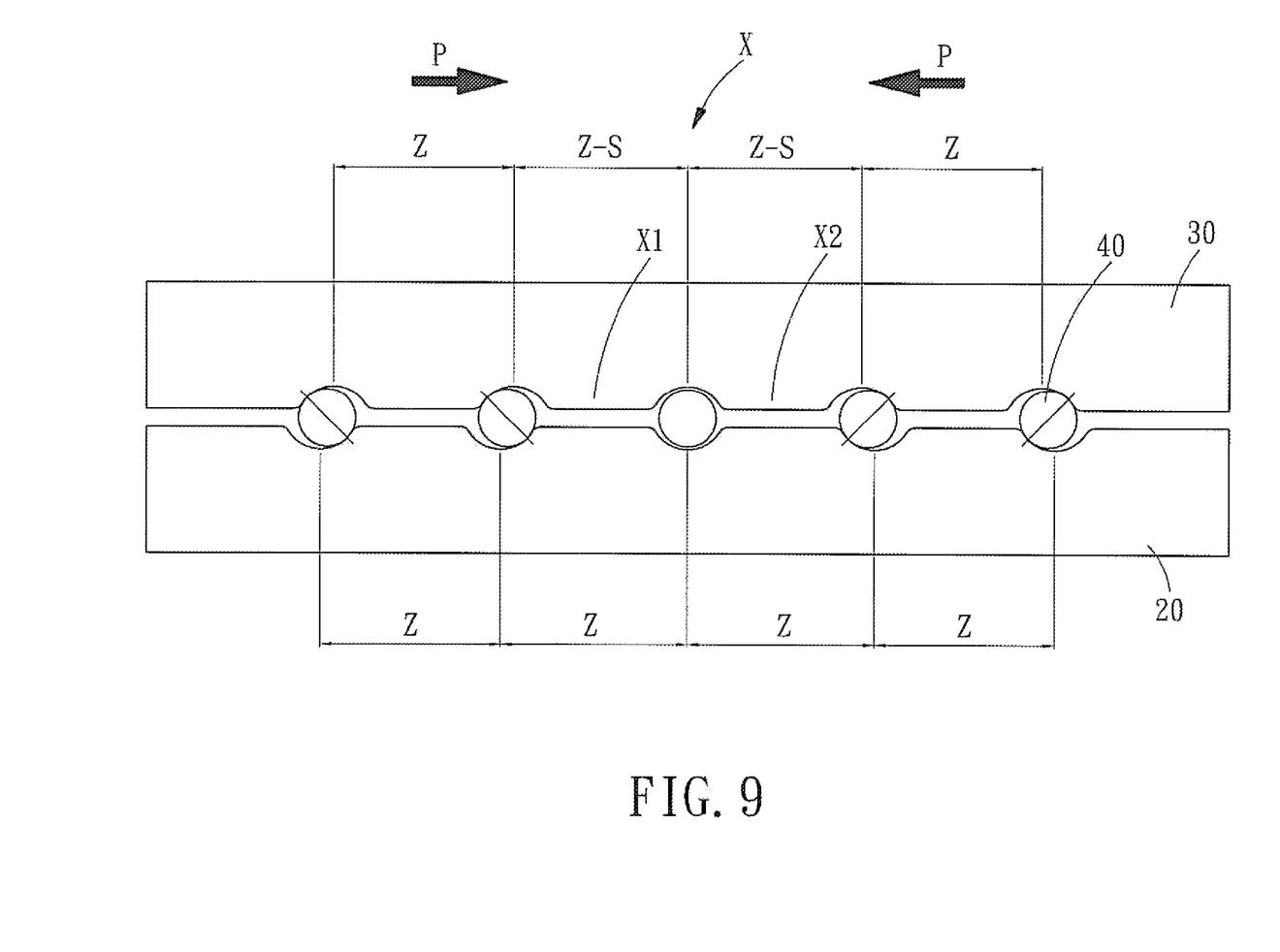
FIG. 9 is another illustrative view of showing that the lead deviation is changed from large to smaller.

Referring to FIG. 9, similarly, the interval helical track X of the nut 30 of the present invention includes a first track X1, a second track X2, and a lead deviation S is subtracted from the lead lengths Z of the first track X1 and the second track X2 respectively. By such arrangements, the preload forces P caused by the lead deviation S to the rolling elements 40 are opposite in direction.

Additionally, the lead of the interval helical track and the lead of the screw can be gradually changed, by such arrangements, the preload forces caused by the lead deviation S to the rolling elements can be changed gradually, the same reason, the lead deviation therein is gradually changed. Consequently, during rolling from one side of the nut to the other side of the nut, the preload forces applied on the rolling elements can be changed from large to smaller then back to larger.

To summarize, the preload structure of the present invention comprises an interval helical track in the inner surface of the nut. The lead of the interval helical track is different from that of the adjacent helical groove, so as to produce a lead deviation between the helical groove of the nut and the helical groove of the screw. By the lead deviation, the fittings number demanded of circulation system can be reduced, and not only the single circulation fittings can be used, but also the nut of the present invention is shorter and needs no extra machining, and the producer only needs to control the deviation of the interval helical track during rubbing to achieve various preload changes.

While we have shown and described various embodiments in accordance with the present invention, it is clear to those skilled in the art that further embodiments may be made without departing from the scope of the present invention.

What is claimed is:

1. A preload structure for a ball screw comprising a screw, a nut, a plurality of rolling elements and a circulation system; wherein:
    the screw is formed with a helical groove in an outer surface thereof;
    the nut is formed with a helical groove in an inner surface thereof;
    the rolling elements are retained between the helical groove of the screw and the helical groove of the nut; and
    the circulation system is mounted on the nut and provided for circulation of rolling elements which have passed though the helical grooves; the preload structure for a ball screw characterized in that:
    the helical groove in the inner surface of the nut includes an interval helical track whose lead is different from a lead of the adjacent helical groove, so as to produce a lead deviation between the helical groove of nut and the helical groove of the screw;
    the lead of the interval helical track is different from a lead of the screw, the lead deviation between the interval helical track and the helical groove of the screw is gradually changed, when rolling from one side of the nut to the other side of the nut, a force applied on a rolling element is changed from large to smaller then back to larger.

2. The preload structure for a ball screw as claimed in claim 1, wherein the interval helical track is located at a central section of the nut, the lead of the interval helical track is greater than the lead of the helical groove at both sides of the interval helical track, so as to produce the lead deviation between the helical groove of nut and the helical groove the screw, thus producing outward preload forces on the rolling elements.

3. The preload structure for a ball screw as claimed in claim 1, wherein the interval helical track is located at a central section of the nut, the lead of the interval helical track is smaller than the lead of the helical groove at both sides of the interval helical track, so as to produce the lead deviation between the helical groove of nut and the helical groove of the screw, thus producing inward preload forces on the rolling elements.

4. The preload structure for a ball screw as claimed in claim 2, wherein the rolling elements at each side of the interval helical track are loaded equally.

5. The preload structure for a ball screw as claimed in claim 3, wherein the rolling elements at each side of the interval helical track are loaded equally.

6. The preload structure for a ball screw as claimed in claim 2, wherein preload forces applied on the rolling elements at both sides of the interval helical track are reverse in direction.

7. The preload structure for a ball screw as claimed in claim 3, wherein preload forces applied on the rolling elements at both sides of the interval helical track are opposite in direction.

8. The preload structure for a ball screw as claimed in claim 1, wherein a lead angle of the interval helical track is different from a lead angle of the helical groove of the screw.

* * * * *